(12) United States Patent
Young (10) Patent No.: US 7,373,217 B2
(45) Date of Patent: May 13, 2008

(54) APPARATUS FOR SLICING A FOOD PRODUCT AND METHOD THEREFORE

(75) Inventor: William D. Young, Owatonna, MN (US)

(73) Assignee: Hormel Foods, LLC, Austin, MN (US)

( * ) Notice: Subject to any disclaimer, the term of this patent is extended or adjusted under 35 U.S.C. 154(b) by 1325 days.

(21) Appl. No.: 10/409,752

(22) Filed: Apr. 8, 2003

(65) Prior Publication Data

US 2004/0200365 A1 Oct. 14, 2004

(51) Int. Cl.
*G06F 19/00* (2006.01)
*G06F 7/66* (2006.01)
*G05B 15/00* (2006.01)
*G05B 19/00* (2006.01)

(52) U.S. Cl. .................. 700/127; 700/95; 700/258; 700/259

(58) Field of Classification Search ............. 700/95, 700/258–259, 127; 83/73–75, 361, 365, 83/367, 370, 932
See application file for complete search history.

(56) References Cited

U.S. PATENT DOCUMENTS

| | | | | |
|---|---|---|---|---|
| 3,363,656 A | 1/1968 | Snyder | .................. | 146/103 |
| 3,797,353 A | 3/1974 | Calhan | .................. | 83/718 |
| 4,208,936 A | 6/1980 | Whitehouse | .................. | 83/713 |
| 4,226,147 A * | 10/1980 | Kumzi | .................. | 83/37 |
| 4,226,540 A | 10/1980 | Barten et al. | .................. | 356/445 |
| 4,258,530 A * | 3/1981 | Mukumoto | .................. | 53/517 |
| 4,356,205 A | 10/1982 | Richards | .................. | 426/518 |
| 4,356,746 A | 11/1982 | Whitehouse | .................. | 83/411 |
| 4,406,545 A | 9/1983 | Montone et al. | .................. | 356/380 |
| 4,420,997 A | 12/1983 | Whitehouse | .................. | 83/105 |
| 4,428,263 A | 1/1984 | Lindee et al. | .................. | 83/354 |
| 4,548,107 A | 10/1985 | Marchese et al. | .................. | 83/23 |
| 4,557,019 A | 12/1985 | Van Devanter et al. | .................. | 17/52 |
| 4,580,475 A | 4/1986 | Antonissen | .................. | 83/71 |
| 4,726,094 A | 2/1988 | Braeger | .................. | 17/54 |
| 4,875,254 A | 10/1989 | Rudy et al. | .................. | 17/61 |
| 4,962,568 A | 10/1990 | Rudy et al. | .................. | 17/52 |

(Continued)

OTHER PUBLICATIONS

Scanvaegt, Model B-35M Norfo Portion Cutter, Web Page, Jul. 23, 2003.

(Continued)

*Primary Examiner*—Ronald Hartman, Jr.
(74) *Attorney, Agent, or Firm*—IPLM Group, P.A.

(57) ABSTRACT

Apparatus and method for slicing a food product having a non-uniform cross-sectional area. A laser line scanner scans the cut face of the food product. A line scan camera receives light reflected from the cut face of the food product. The line scan camera is positioned such that the line field of view of the line scan camera intersects the scanning line of the laser line scanner at the cut face of the food product. A controller determines an area of the cut face of the food product using the light reflected from the cut face of the food product and advances the food product to be cut by the cutting device by an amount such that a next slice of the food product cut by the cutting device will have a thickness such that the next slice will be of the predetermined weight based upon the area of the cut face.

18 Claims, 5 Drawing Sheets

U.S. PATENT DOCUMENTS

| | | |
|---|---|---|
| 5,039,857 A | 8/1991 | Whitehouse ................ 250/360 |
| 5,041,056 A | 8/1991 | Hutton ....................... 452/171 |
| 5,054,345 A | 10/1991 | Weber ............................ 83/42 |
| 5,076,124 A | 12/1991 | Whitehouse ................. 83/105 |
| RE33,904 E | 4/1992 | Rudy et al. ................. 452/150 |
| 5,136,906 A | 8/1992 | Antonissen et al. ........... 83/42 |
| 5,224,407 A | 7/1993 | Koch et al. .................. 83/468 |
| 5,267,168 A | 11/1993 | Antonissen et al. ........ 364/468 |
| 5,352,153 A | 10/1994 | Burch et al. ................ 452/157 |
| 5,477,760 A | 12/1995 | Kuchler ......................... 83/58 |
| 5,481,466 A * | 1/1996 | Carey ......................... 700/167 |
| 5,724,874 A | 3/1998 | Lindee et al. .................. 83/27 |
| 5,937,080 A * | 8/1999 | Vogeley et al. ............. 382/110 |
| 6,186,059 B1 | 2/2001 | Mello et al. .................. 100/35 |
| 6,198,834 B1 * | 3/2001 | Belk et al. .................. 382/110 |
| 6,407,818 B1 | 6/2002 | Whitehouse ................ 356/627 |
| 6,882,434 B1 * | 4/2005 | Sandberg et al. ........... 356/601 |
| 7,153,203 B2 * | 12/2006 | Pfarr et al. .................. 452/150 |
| 7,251,537 B1 * | 7/2007 | Blaine et al. .................. 700/29 |
| 2002/0019208 A1 | 2/2002 | Boody et al. |
| 2004/0032974 A1 * | 2/2004 | Kriesel ....................... 382/110 |
| 2005/0199111 A1 * | 9/2005 | Sandberg et al. ............... 83/13 |
| 2006/0156878 A1 * | 7/2006 | Faires et al. .................... 83/13 |
| 2006/0162518 A1 * | 7/2006 | Biggs et al. ................. 83/75.5 |
| 2006/0288832 A1 * | 12/2006 | Sandberg .................... 83/75.5 |
| 2007/0157776 A1 * | 7/2007 | Sorensen et al. ............... 83/23 |
| 2007/0243806 A1 * | 10/2007 | Woods et al. ............... 452/150 |

OTHER PUBLICATIONS

Scanvaegt Quotation, Nov. 1, 2002.
U.S. Appl. No. 09/502,848, Young, Optimized Loin Saw (Hormel) Filed Feb. 11, 2000.

\* cited by examiner

APPARATUS FOR SLICING A FOOD PRODUCT AND METHOD THEREFORE

TECHNICAL FIELD

The present invention relates generally to apparatus and methods for slicing food products and, more particularly, to apparatus and methods for slicing food products with an adjustable cutting thickness determination obtained through optical means.

BACKGROUND

In the food industry, it is common to pre-cut various food products, such as meats, before the food products are dispensed to the consumer. As an example, pork chops are commonly cut from a pork loin and marketed to the consumer individually or in packages with a plurality of pork chops in each package.

Various automated systems have been constructed to perform the task of pre-cutting food products, such as meats, to create individual items for the convenience of the consumer. For example, an apparatus could cut pork chops having a consistent thickness resulting in multiple pork chops having a constant thickness.

However, some food products, including pork loins, have a non-uniform cross-sectional area. The shape of a pork loin is not uniform over its length. A pork loin can be bigger or smaller at one end or the other and may vary in cross-sectional area along its length. As progressive cuts made in the pork loin, the cross-sectional area of the pork loin may vary. Thus, successive pork chops cut from a pork loin may be larger or smaller depending upon the actual cross-section of the pork loin where the pork chop is cut. Thus, cutting a plurality of items (e.g., pork chops) from a food product (e.g., a pork loin) with a constant thickness may result in successive pork chops which can vary significantly in weight.

Food products may be sold by weight. Thus, if the weight of individual pork chops vary, the collective of weight of a package of pork chops may also vary. However, since the package of pork chops is being sold to the consumer by weight, different packages of pork chops (all containing the same number of pork chops) may have different prices. The consumer may then need to select accordingly and purchase a package of pork chops reasonably matching the consumer's expectations.

Food products may also be sold by number of items. For example, a package of pork chops may be sold as a package containing a predetermined number of pork chops irrespective of the weight of an individual pork chop. Since the weight of individual pork chops may vary, the weight of a package of a predetermined number of pork chops will also vary. This may result in the consumer getting more or less (weight) depending upon which package is purchased. Thus, differing packages may be more or less desirable for the consumer to purchase.

However, food products may also be sold requiring a precise number of items and a precise weight for those items, either collectively or individually. This dual requirement will not allow a significant variation in weights among the individual items.

Since the cross-section of a food product, e.g., a pork loin, may vary but the weight of each individual item, e.g., pork chop, must stay the same, then the thickness of each individual item must either vary or another operation must be accomplished following the cutting in order to adjust the weight of each individual item. For example, trimming of the edges of a cut pork chop may be done in order to reduce the weight of each pork chop to be consistent among pork chops. However, not only is manual trimming time-consuming but it also results in a significant amount of wasted material.

Prior art optical systems have been employed to attempt to determine the size of a product being cut and to adjust the thickness of the cut in order to control the weight of each individual item being cut.

U.S. Pat. No. 5,267,168, Antonissen et al, Apparatus For and Method of Controlling Slicing Machine, discloses a slicing machine which includes a control system having a camera which views a cut face of a product being sliced. The processing of the image data includes classifying the image data by comparison with an intensity threshold which is varied automatically in accordance with the populations of data and the different classes. A source of illumination (7) is positioned below the face of the product (3) being cut by blade (1). A camera (6) is also set at an angle with respect to the face of the product (3) being cut by blade (1). The source of illumination (7) illuminates the entire face of the product (3) being cut at one time and the camera (6) senses light from a general area facing the product (3) being cut which includes light from the source of illumination (7) being reflected.

U.S. Pat. No. 5,054,345, Weber, Method of Obtaining Constant Weight Portions or Slices of Sliced Food Products, discloses a method for obtaining constant weight portions or slices from sliced food products where, in each case, individual slices or portions of several slices with exactly predeterminable weight can be formed in real time operation during the cutting process by detecting the cut surface area, taking account of the specific weight and computing of the required feed of the product. A light source (52) is set at an angle $\alpha$ with respect to surface (48) of ham (10). The light (54) remitted or diffusely reflected from surface (48) falls as light beam (54) onto video recorder (56) arranged at an angular specular reflection angle $\beta$ also with respect to surface (48) of ham (10). Again, the light source (52) illuminates the entire surface (48) of the ham (10) and the video recorder (56) records light including light being reflected from surface (48) of ham (10).

A problem with optical systems intended to determine the cross-sectional area of the food product to be cut is that it is difficult for the sensor to determine what light is reflected from the food product and what light is ambient or is reflected from background clutter. Some systems use an amplitude threshold to filter the incoming light signals. However, ambient light or light reflecting from the background may still be of sufficient amplitude to interfere with a proper determination of the cross-sectional area of the cut face of the food product.

SUMMARY OF THE INVENTION

Thus, there is a need for an accurate system to cut a plurality of slices of the food product, which has a variable cross-sectional area, with the slices having accurate predetermined weights. Such a system would allow the packaging of the plurality of slices of the food product in which the number of slices is constant and in which the weight of the package is constant.

The present invention solves many of the problems associated with prior art optical systems intended to determine the cross-sectional area of a food product so that the food product may be sliced at an appropriate thickness.

Common prior art optical systems designed to perform this task have a sensor, e.g., a camera, which views the entire face of the food product being cut.

Commonly, prior art optical system designed to perform this task flood the entire cut face of the food product being sliced with illumination. Such systems commonly view the area, including the cut face of the food product, with a camera or video recorder expecting to capture the light from the illumination source which is reflected from the cut face of the food product with the camera or video recorder and thereby determine the cross-sectional area of the cut face. However, extraneous ambient light and, especially, light from the illumination source which reflects off of a surface other than the cut face of the food product often interferes with making a quick and accurate determination of the area of the cut face. The job of the pusher or gripper is to hold the food product securely in place throughout the slicing operation. However, light from the illumination source may reflect from the pusher or gripper (as well as other components) and also be received by the camera or video recorder. The result may be a determination that the cross-sectional area of the food product being sliced is larger than it really is and the resulting next slice of the food product being inappropriately thin and the weight of the slice being inappropriately light. This problem is exacerbated as the slicing operation of the food product nears completion and the pusher or gripper is necessarily brought very close to the cut face being examined, because of the resulting shortness in the already mostly sliced food product. In one implementation, the pusher or gripper is actually constructed of bright and shiny stainless steel, in order to maintain cleanliness of the equipment, making reflections from its surface even more likely.

The present invention avoids these problems, in part, by scanning the cut face of the food product with a laser line scanner illuminating not the entire cut face of the food product and adjacent areas but only a narrow line of illumination. The laser line scanner illuminates the food product as the food product is being moved with respect to the illumination of the laser line scanner resulting in the entire cut face of the food product being illuminated over a period of time as the relative position of the food product and the laser line scanner changes. A complementary line scan camera is positioned so that its line field of view intersects the line illumination from the laser line scanner at the cut face of the product during the scanning operation. Since the line view of the line scan camera and the line illumination of the laser line scanner only intersect along the scanning plane at the cut face of the food product, only light reflected from the cut face of the food product will be received by the line scan camera and only light reflected from the cut face will be used in a determination of the area of the cut face of the food product. For each line illumination, the line scan camera can accurately determine the length of the line being reflected and the dimension, e.g., height, of the cut face of the food product at that point across the entire cut face of the food product. As the food product and the laser line scanner are moved with respect to each other, successive line illumination scans are captured by the line scan camera and successive determinations are made to the dimension of the cut face of the food product at that point. Knowing the width of each line scan illumination and the distance between successive line scans, allows these dimensions to be summed in order to accurately determine the cross-sectional area of the cut face of the food product. Once the cross-sectional area is known, the known density of the food product will allow the food product to be sliced at an appropriate thickness so that each slice can have a predetermined weight.

In one embodiment, the present invention provides an apparatus for slicing a food product, having a non-uniform cross-sectional area along a longitudinal axis, capable of being sliced along a cutting line orthogonal to the longitudinal axis to obtain a plurality of slices of the food product having a predetermined weight. A cutting device is positioned along the cutting line. A cutting table is capable of moving the food product along the longitudinal axis and along an axis parallel to the cutting line. A laser line scanner is capable of scanning the cut face of the food product with a scanning line along an orientation as the food product is moved orthogonal to the longitudinal axis. A line scan camera is capable of receiving light reflected from the cut face of the food product. The orientation of the laser line scanner matches the orientation of the line scan camera. The line scan camera is positioned such that the line field of view of the line scan camera intersects the scanning line of the laser line scanner at the cut face of the food product. A controller determines an area of the cut face of the food product using the light reflected from the cut face of the food product and advances the food product to be cut by the cutting device by an amount such that a next slice of the food product cut by the cutting device will have a thickness such that the next slice will be of the predetermined weight based upon the area of the cut face.

In an alternative embodiment, the present invention provides a method of adjusting a cutting width of a food product, having a non-uniform cross-sectional area along a longitudinal axis, capable of being sliced along a cutting line orthogonal to the longitudinal axis to obtain a plurality of slices of the food product having a predetermined weight. The food product is moved along a scanning axis parallel to the cutting line. The cut face of the food product is scanned with a scanning line along an orientation from a laser line scanner as the food product is moved along the axis. Light reflected by the cut face of the food product is received with a line scan camera having a line field of view along an orientation. The orientation of the laser line scanner matches the orientation of the line scan camera. The line scan camera is positioned such that the line field of view of the line scan camera intersects the scanning line of the laser line scanner at the cut face of the food product. An area of the cut face of the food product is determined using the light reflected from the cut face of the food product. The food product to be cut is advanced by the cutting device by an amount such that a next slice of the food product cut by the cutting device and will have a thickness such that the next slice will be of the predetermined weight based upon the area of the cut face. The food product is cut with the cutting device.

In a preferred embodiment, the cutting table repeatedly moves the food product in a direction parallel to the cutting line allowing the food product to be sliced by the cutting device and subsequently moves the food product in a reverse direction away from the cutting device.

In a preferred embodiment, the laser line scanner scans the cut face of the food product while the cutting table is moving the food product in the reverse direction away from the cutting device.

In a preferred embodiment, the controller determines the area of the cut face of the food product from measurements taken while the cutting table is moving the food product in the reverse direction away from the cutting device.

In a preferred embodiment, the area of the cut face of the food product is based upon an amplitude threshold of the light reflected by the cut face of the food product.

In a preferred embodiment, the food product has a density which varies, the density being visually identifiable and wherein the predetermined weight is also based upon the density of the food product.

In a preferred embodiment, the orientation of the laser line scanner and the orientation of the line scan camera is orthogonal to the cutting line.

In a preferred embodiment, the laser line scanner is positioned at an acute angle to the longitudinal axis.

In a preferred embodiment, the line scan camera is positioned with the line field of view parallel to the longitudinal axis.

DETAILED DESCRIPTION

Figure 1:
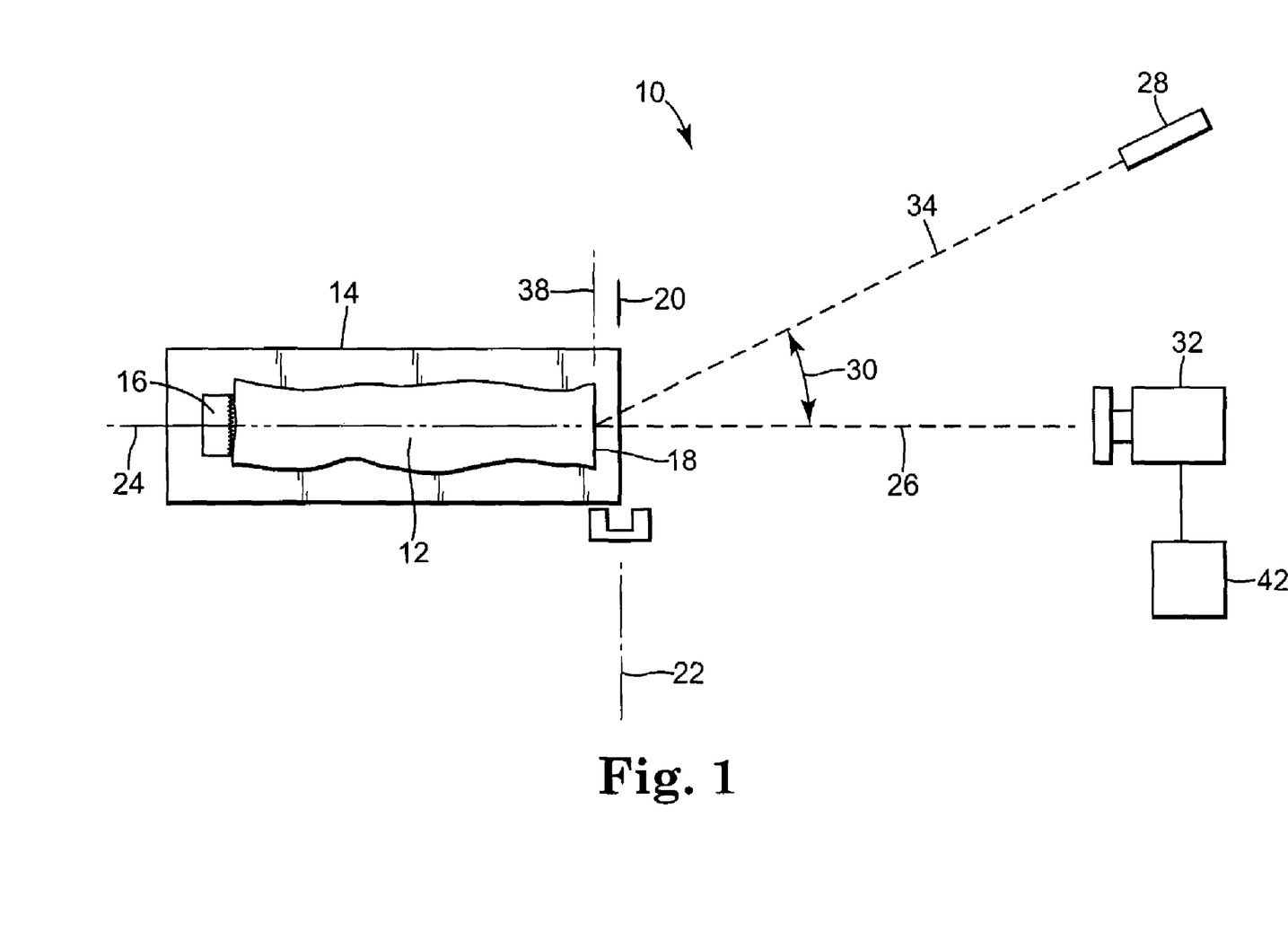
FIG. 1 is a top plan schematic view of an embodiment of the apparatus of the present invention.

FIG. 1 shows, in schematic format, an apparatus 10 for slicing food product 12. Food product 12, in this example, is a pork loin supported by food table 14 secured by pusher 16. Cut face 18 of food product 12 faces to the right in the drawing. Cutting blade 20 is positioned along cutting plane 22 and is adapted to cut a slice, in this example, a pork chop, from food product 12.

Food table 14 can move forward along a longitudinal axis 24 of food product 12, toward cutting plane 22 and to the right in the drawing, in order to advance cut face 18 of food product 12 into the proper position so that the proper amount of food product 12 can be sliced from a food product 12 by cutting blade 20. Food table 14 can also move backward along longitudinal axis 24 of food product 12, away from cutting plane 22 and to the left in the drawing, either to enable cut face 18 of food product 12 to be scanned or to facilitate cut face 18 of food product 12 to be able to clear cutting blade 20 upon completion of a slicing operation. In addition, food table 14 can also move sideways orthogonal to longitudinal axis 24 of food product 12, upwards and downwards in the drawing, in order to engage or disengage food product 12 with cutting blade 20.

In general, apparatus 10 operates with food table 14 moving food product 12, in this embodiment a pork loin, forward along longitudinal axis 24 of food product 12 toward cutting plane 22 in order to position food product 12 for an appropriate cutting thickness. Once appropriately positioned, food table 14 moves food product 12 upwards in the drawing into cutting blade 20 cutting a slice from food product 12. Optionally, food table 14 moves backwards (to the left in the drawing) away from cutting plane 22 and order to clear cutting debris and to ensure that food product 12 will be clear of cutting blade 20. Food table 14 then moves food product 12 downwards in the drawing away from cutting blade 20. Food table 14 is then ready to begin another cycle by advancing food product 12 forward again toward cutting plane 22 so that food product 12 is properly positioned so that another slice may be cut from food product 12.

As food table 14 moves food product 12 downwards in the drawing, laser line scanner 28 scans a line across cut face 18 of food product 12. Laser line scanner 28 is positioned at an acute angle 30 to longitudinal axis 24. Even though laser line scanner 28 is stationary, laser line scanner 28 scans a vertical line successively across cut face 18 of food product 12 as food table 14 moves of food product 12 downwards in the drawing (to the left from laser line scanner's 28 view) because cut face 18 of food product 12 is moving.

At the same time, line scan camera 32 is positioned with a field of view oriented to intersect line scan 34 from laser line scanner 28 at cut face 18 of food product 12 along scanning plane 36. Light 26 reflected from cut face 18 of food product 12 is within the line field of view of and will be captured by line scan camera 32. Again as food product 12 moves across the field of view of line scan camera 32, the entire cut face 18 of food product 12 will be scanned. The result of line scans 36 are passed to controller 42.

Figure 2:
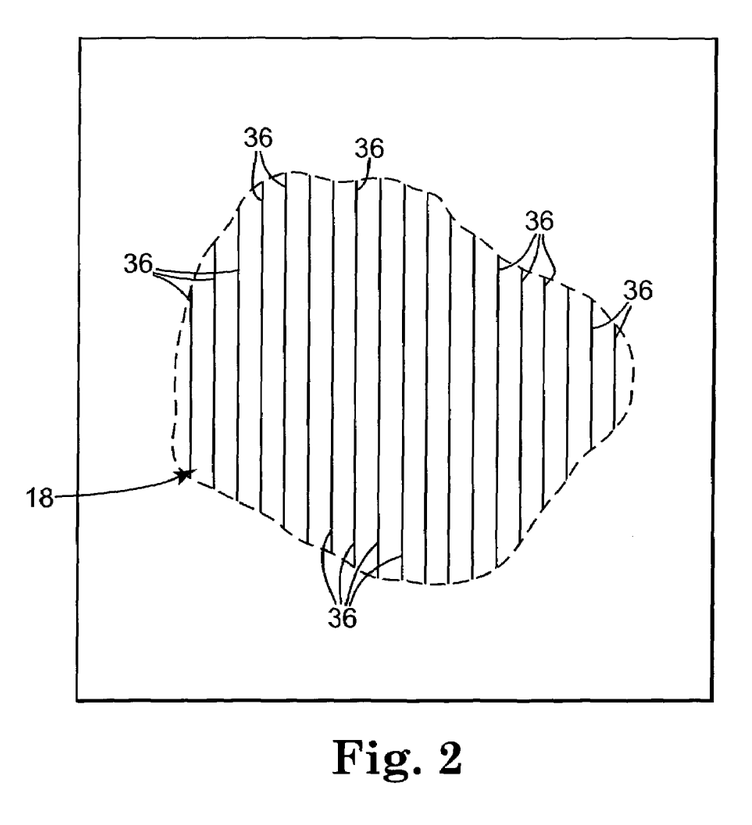
FIG. 2 is a diagram illustrating the line scan camera view of a series of line scans made across the cut face of a food product made by the laser line scanner of the apparatus illustrated in FIG. 1.

FIG. 2 illustrates a series of line scans 36 received by line scan camera 32. In the orientation illustrated in FIG. 1, scanning will sequentially occur starting with scan line 36 on the left in FIG. 2, since the left side of cut face 18 of food product 12 is the first portion of food product 12 viewed by line scan camera 32 as food product 12 is moved across the line field of view of line scan camera 32. Since laser line scanner 28 scans in a vertical line at a rate much higher than the horizontal velocity of food table 14, line scans 36 are still substantially a vertical even though food table 14 is moved horizontally. Of course, the same result is obtained even though line scans 36 are not perfectly vertical. For purposes of illustrating and describing the invention, line scans 36 are illustrated as being vertical. Subsequent line scans 36 will progressively move across cut face 18 of food product 12 until the entire cut face 18 of food product 12 has been scanned.

Line scan camera 32 will only receive light reflected from cut face 18 of food product 12. Thus, each of line scans 36 received by line scan camera 32 represents the height of cut face 18 of food product 12 at the horizontal location of a particular one of line scans 36 across cut face 18 of food product 12. If cut face 18 of food product 12 is higher, line scan 36 received by line scan camera 32 will be relatively longer. If cut face 18 of food product 12 is lower, line scan 36 received by line scan camera 32 will be relatively shorter.

Once cut face 18 of food product 12 has entirely passed the field of view of line scan camera 32, line scan camera 32 will have captured a series of line scans 36, each having a length representing the height of the cut face 18 of food product 12 at the horizontal point along cut face 18 of food product 12 where the laser line scan 34 from laser line scanner 28 intersects scanning plane 38.

Line scan camera 32 is coupled to controller 42 which calculates an area of cut face 18 of food product 12 and subsequently controls food table 14 and order to advance food product 12 into a position so that a slice of food product 12 may be sliced from food product 12 by cutting blade 20. Knowing the distance between scan lines 36, based on the speed of the laser line scanner 28 and the speed of food table 14, enables controller 42 to sum each of line scans 36 and determine the actual area of cut face 18 of food product 12.

Figure 3:
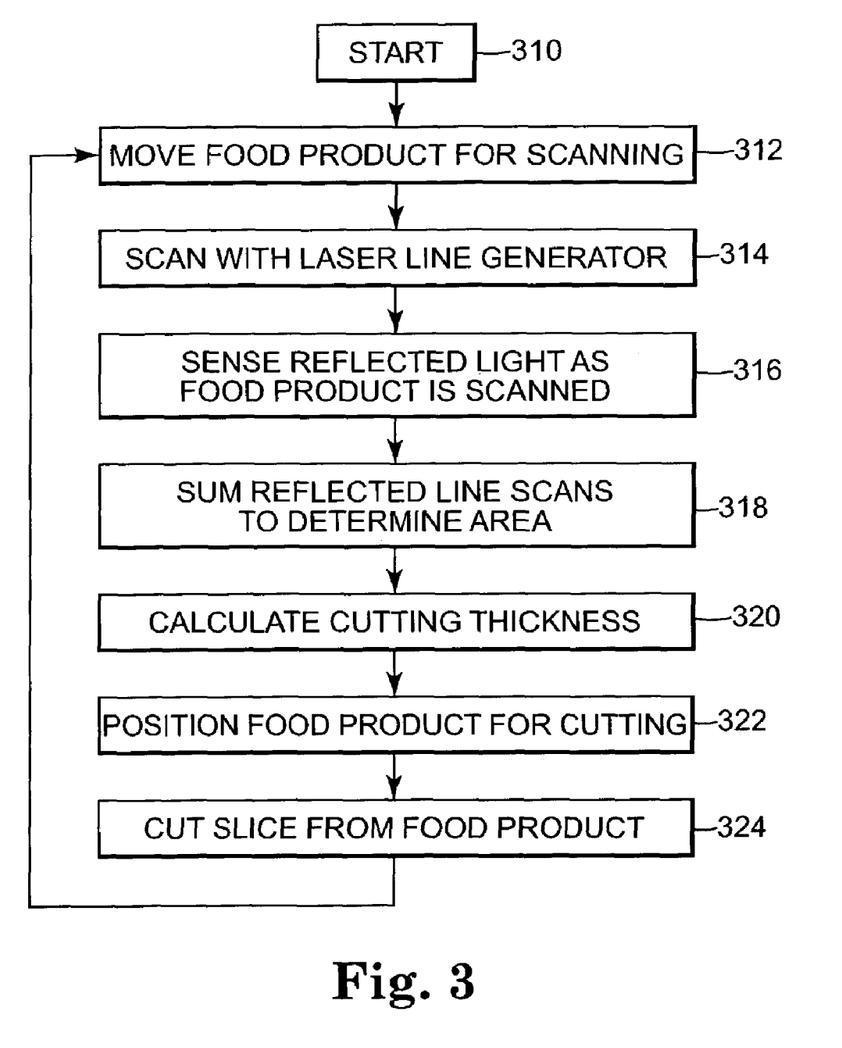
FIG. 3 is a flow chart illustrating the operation of an embodiment of the present invention.

This process can be described in connection with the flow chart illustrated in FIG. 3. The process starts in block 310. Block 312 moves food product 12 with respect to laser line scanner 28. In the preferred embodiment, food product 12 is moved laterally with respect to a direction in which cut face 18 is viewed directly. As laser line scanner 28 is stationary, scanning a vertical line, vertical line scans 36 progressively move across cut face 18. Of course, it should be recognized and understood that various forms of creating relative movement between food product 12 and laser line scanner 28 are possible. For example, food product may be moved forward or back longitudinally from cutting plane 22. If laser line scanner 28 is set at an angle to cut face 18, line scans 36 will also progressively move across cut face 18. Other geometries and movements are also possible including a stationary food product 12 with a moving laser line scanner 28 or complex movements of food product 12 involving more than one axis.

As food product 12 is moved relative to laser line scanner 28, laser line scanner 28 scans cut face 18 of food product 12 (block 314) with a vertically oriented laser line scan. At the same time, line scan camera 32 senses light reflected from cut face 18 of food product 12 (block 316). Each individual one of laser line scans 36 represents the height of cut face 18 of food product 12 at the horizontal point across cut face 18 which intersects light from laser line scanner 28.

Block 318 sums the data from each reflected line scan 36 in controller 42. Since each of line scans 36 represents the height of cut face 18 of food product 12, and the distance between each of line scans 36 can be known, the sum of the length of each of line scans 36 times the distance between line scans 36 represents the area of cut face 18 of food product 12.

Knowing the area of cut face 18 of food product 12 and the average density of food product 12, it is an easy calculation to determine a desired thickness which should be sliced from food product 12 in order to obtain a slice having a predetermined thickness (block 320).

Food product 12 is positioned (block 322) for cutting a slice of food product 12 having the desired thickness. For example in the preferred embodiment, food table 14 moves forward toward cutting plane 22 so that cutting blade 20 is positioned to slice the appropriate thickness from food product 12. Food table 14 then moves (block 324) food product 12 across cutting blade 20 to cut the desired slice from food product 12, in the preferred embodiment a pork chop having a desired thickness and weight from a pork loin.

Figure 4:
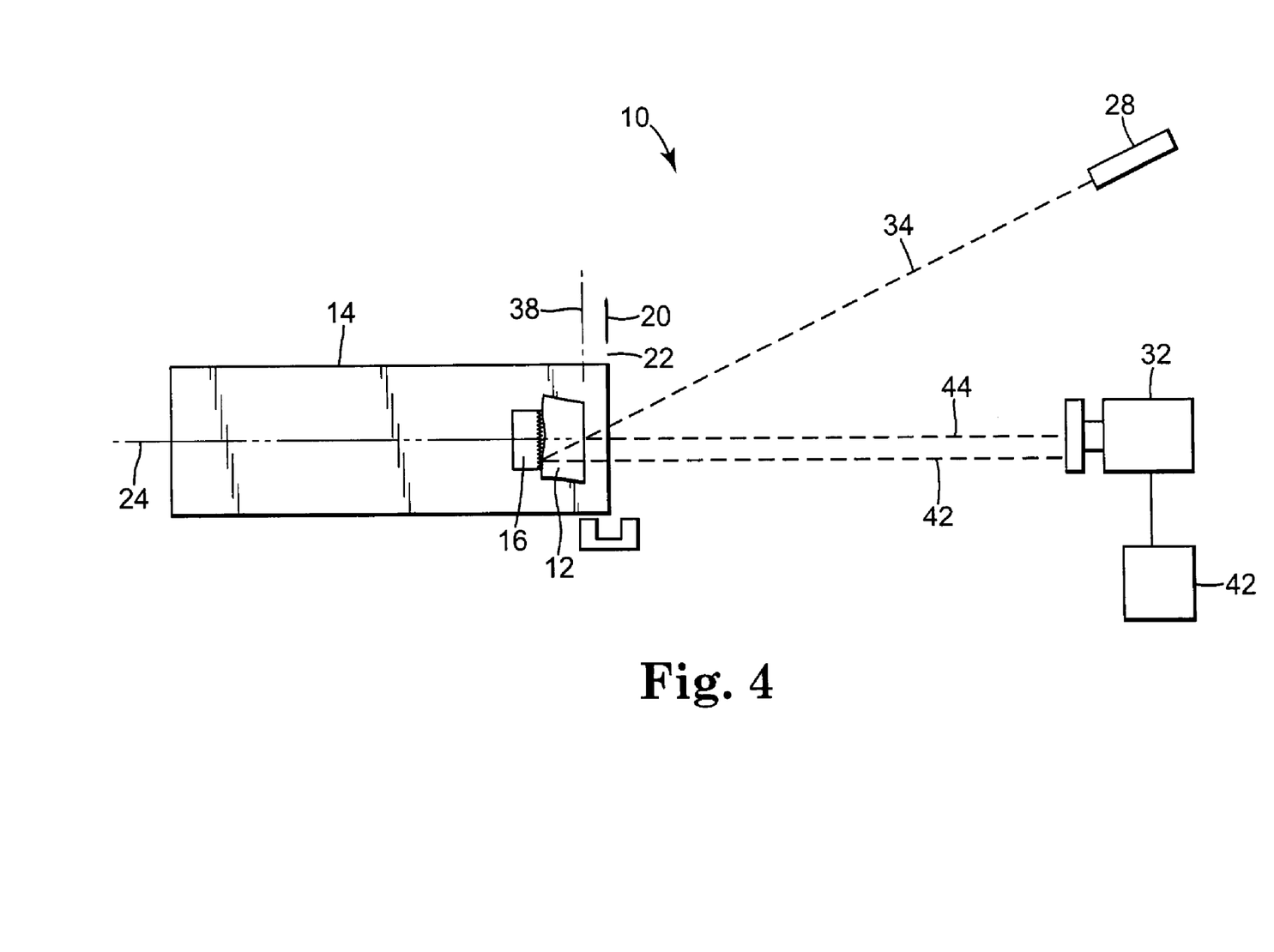
FIG. 4 is a top plan schematic view of an embodiment of the apparatus of the present invention illustrating the effect of located behind the scanning plane.

FIG. 4 illustrates the effect of the reflection of light from an extraneous object not on, in this case behind, scanning plane 38. In the apparatus illustrated in FIG. 4, the remaining portion of food product 12 is small. Most of the slices have already been sliced or removed from food product 12. In this example an extraneous object, namely pusher 16 located at the rear of food product 12 is somewhat near but still located behind scanning plane 38. Pusher 16 is in a prime position to reflect light from laser line scanner 28 and confuse the result of reflected light incident in the field of view of line scan camera 32 and to provide an erroneous size for the area of cut face 18 of food product 12.

Since laser line scanner 28 is positioned at an angle, and this embodiment at an acute angle to the longitudinal axis of food product 12, an object located behind scanning plane 38 will reflect light from laser line scanner 28 which will be off axis of line scan camera 32. Light (line scan 34) from laser line scanner 28 passes beyond scanning plane 38 and reflects from pusher 16 along line 42 toward line scan camera 32. However, reflected light 42 is off-axis, below axis in FIG. 4, and out of field of view 44 of line scan camera 32. Since reflected light 42 is out of the field of view 44 of line scan camera 32, line scan camera 32 will ignore reflected light 42 and pusher 16 will not affect the scan area of cut face 18 of food product 12.

Figure 5:
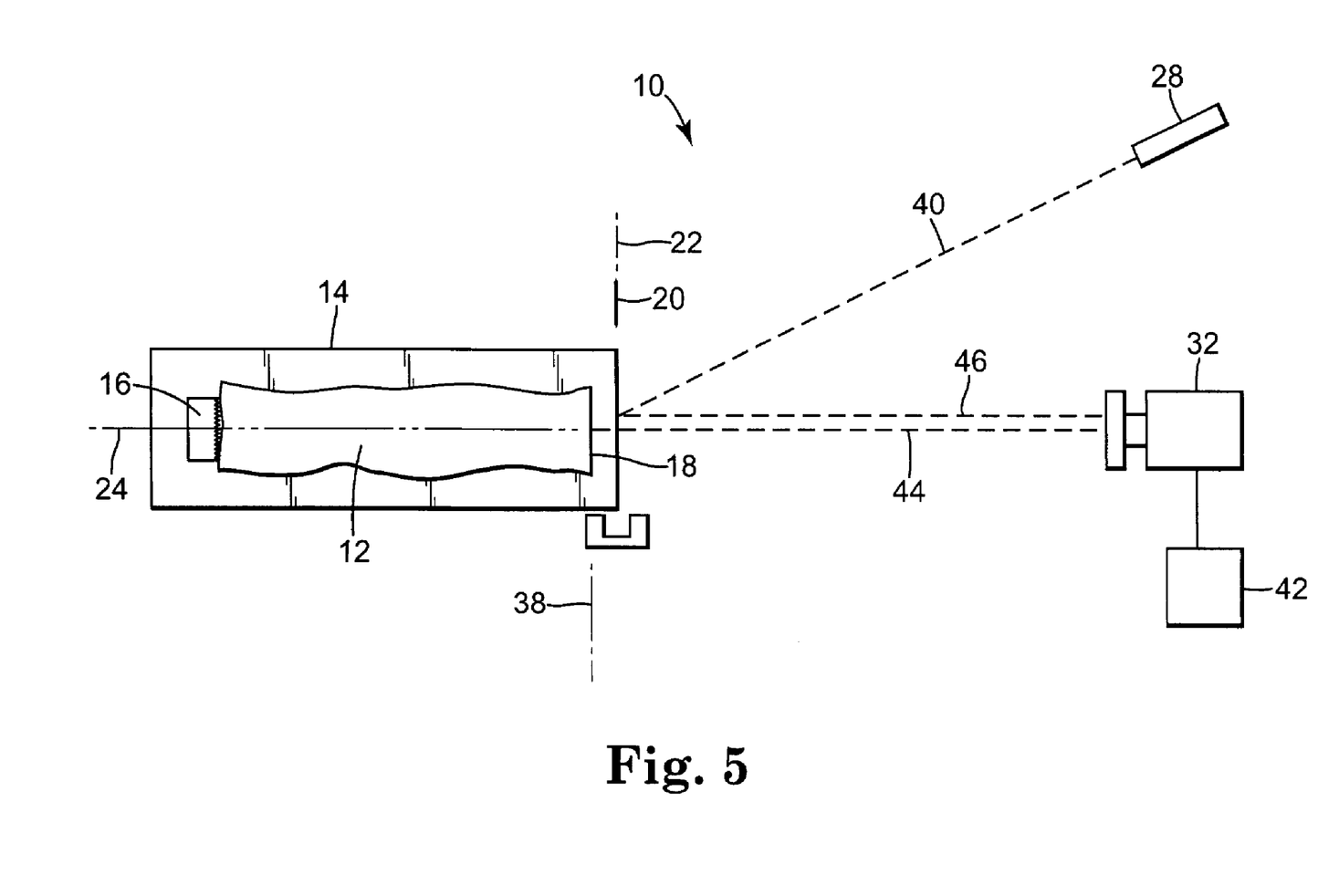
FIG. 5 is a top plan schematic view of an embodiment of the apparatus of the present invention illustrating the effect of located in front of the scanning plane.

FIG. 5 illustrates the effect of the reflection of light from an extraneous object positioned in front of scanning plane 38. Since laser line scanner 28 is positioned at an angle, and this embodiment at an acute angle to the longitudinal axis of food product 12, an object located behind scanning plane 38 will reflect light from laser line scanner 28 which will also be off axis of line scan camera 32. Light (line scan 34) from laser line scanner 28 does not reach scanning plane 38 before it is reflected along line 46 toward line scan camera 32. However, reflected light 46 is off-axis, above axis in FIG. 5, and out of field of view 44 of line scan camera 32. Since reflected light 46 is out of the field of view 44 of line scan camera 32, line scan camera 32 will ignore reflected light 46 and reflected light 46 will not affect the scan area of cut face 18 of food product 12.

It is to be recognized and understood that other geometries between laser line scanner 28, cut face 18 of food product 12 and line scan camera 32, beyond those illustrated in the previous Figures, are also contemplated and within the scope of the present invention. It is only necessary that line scans 36 from laser line scanner 28 intersect with the line of field of view of line scan camera 32 at scanning plane 38. In particular, it is not necessary that line scan camera 32 be located on the longitudinal axis of food product 12.

It is also to be recognized and understood that while cutting plane 22 and scanning plane 38 in the preferred embodiment are different planes, it is contemplated that cutting plane 22 and scanning plane 38 could be co-planar. Cutting plane 22 is different from scanning plane 38 in the preferred embodiment so that cut face 18 of food product 12 may be moved back from cutting plane 22 slightly in order to ensure that food product 12 is clear of cutting blade 20 as food product 12 is moved away from cutting blade 20.

It is also to be recognized and understood that other possibilities for relative movement between food product 12 and cutting blade 20 are contemplated. For example, food product 12 could remain stationary while cutting blade 20 is moved across food product 12 creating the slicing action.

While laser line scanner 28, in the preferred embodiment, creates vertically oriented line scans 36, it is recognized and understood that other orientations of line scans 36 are possible depending upon the relative movement between laser line scanner 28, food product 12 and line scan camera 32.

Various modifications and alterations of this invention will be apparent to those skilled in the art without departing from the scope and spirit of this invention. It should be understood that this invention is not limited to the illustrative embodiments set forth above.

What is claimed is:

1. An apparatus for slicing a food product, having a non-uniform cross-sectional area along a longitudinal axis, capable of being sliced along a cutting line orthogonal to said longitudinal axis to obtain a plurality of slices of said food product having a predetermined weight, comprising:

a cutting device positioned along said cutting line;

a cutting table capable of moving said food product along said longitudinal axis and along an axis parallel to said cutting line;

a laser line scanner capable of scanning a cut face of said food product with a scanning line along an orientation as said food product is moved orthogonal to said longitudinal axis;

a line scan camera capable of receiving light reflected from said cut face of said food product, said line scan camera having a line field of view along an orientation;

said orientation of said laser line scanner matching said orientation of said line scan camera;

said line scan camera being positioned such that said line field of view of said line scan camera intersects said scanning line of said laser line scanner at said cut face of said food product;

a controller determining an area of said cut face of said food product using said light reflected from said cut face of said food product and advancing said food product to be cut by said cutting device by an amount such that a next slice of said food product cut by said cutting device will have a thickness such that said next slice will be of said predetermined weight based upon said area of said cut face.

2. An apparatus for slicing as in claim 1 wherein said cutting table repeatedly moves said food product in a direction parallel to said cutting line allowing said food product to be sliced by said cutting device and subsequently moves said food product in a reverse direction away from said cutting device.

3. An apparatus for slicing as in claim 2 wherein said laser line scanner scans said cut face of said food product while said cutting table is moving said food product in said reverse direction away from said cutting device.

4. An apparatus for slicing as in claim 3 wherein said controller determines said area of said cut face of said food product from measurements taken while said cutting table is moving said food product in said reverse direction away from said cutting device.

5. An apparatus for slicing as in claim 1 wherein said area of said cut face of said food product is based upon an amplitude threshold of said light reflected by said cut face of said food product.

6. An apparatus for slicing as in claim 1 wherein said food product has a density which varies, said density being visually identifiable and wherein said predetermined weight is also based upon said density of said food product.

7. An apparatus for slicing as in claim 1 wherein said orientation of said laser line scanner and said orientation of said line scan camera is orthogonal to said cutting line.

8. An apparatus for slicing as in claim 1 wherein said laser line scanner is positioned at an acute angle to said longitudinal axis.

9. An apparatus for slicing as in claim 1 wherein said line scan camera is positioned with said line field of view parallel to said longitudinal axis.

10. A method of adjusting a cutting width of a food product, having a non-uniform cross-sectional area along a longitudinal axis, capable of being sliced along a cutting line orthogonal to said longitudinal axis to obtain a plurality of slices of said food product having a predetermined weight, comprising the steps of:

moving said food product along a scanning axis parallel to said cutting line;

scanning said cut face of said food product with a scanning line along an orientation from a laser line scanner as said food product is moved along said axis;

receiving light reflected by said cut face of said food product with a line scan camera having a line field of view along an orientation, said orientation of said laser line scanner matching said orientation of said line scan camera, said line scan camera being positioned such that said line field of view of said line scan camera intersects said scanning line of said laser line scanner at said cut face of said food product;

determining an area of said cut face of said food product using said light reflected from said cut face of said food product;

advancing said food product to be cut by said cutting device by an amount such that a next slice of said food product cut by said cutting device; and will have a thickness such that said next slice will be of said predetermined weight based upon said area of said cut face; and cutting said food product with said cutting device.

11. A method of adjusting as in claim 10 wherein said food product moves in a direction parallel to said cutting line allowing said food product to be sliced by said cutting device and subsequently moves in a reverse direction away from said cutting device.

12. A method of adjusting as in claim 11 wherein said food product is scanned with said laser line scanner while said food product is moving in said reverse direction away from said cutting device.

13. A method of adjusting as in claim 12 wherein said area of said cut face of said food product is determined from measurements taken while said food product is moving in said reverse direction away from said cutting device.

14. A method of adjusting as in claim 10 wherein said area of said cut face of said food product is based upon an amplitude threshold of said light reflected by said cut face of said food product.

15. A method of adjusting as in claim 10 wherein said food product has a density which varies, said density being visually identifiable and wherein said predetermined weight is also based upon said density of said food product.

16. A method of adjusting as in claim 10 wherein said orientation of said laser line scanner and said orientation of said line scan camera is orthogonal to said cutting line.

17. A method of adjusting as in claim 10 wherein said laser line scanner is positioned at an acute angle to said longitudinal axis.

18. A method of adjusting as in claim 10 wherein said line scan camera is positioned with said line field of view parallel to said longitudinal axis.

* * * * *